United States Patent
Sedlak et al.

(10) Patent No.: US 6,487,649 B1
(45) Date of Patent: Nov. 26, 2002

(54) MICROCOMPUTER

(75) Inventors: Holger Sedlak, Egmating; Franz-Josef Bruecklmayr, Kaufering, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/395,998

(22) Filed: Sep. 13, 1999

Related U.S. Application Data

(63) Continuation of application No. PCT/DE98/00319, filed on Feb. 5, 1998.

(30) Foreign Application Priority Data

Mar. 11, 1997 (DE) .......................................... 197 09 975

(51) Int. Cl.[7] .............................................. G06F 12/00
(52) U.S. Cl. .................................... 711/209; 711/208
(58) Field of Search ................................ 711/209, 208, 711/126

(56) References Cited

U.S. PATENT DOCUMENTS

| | | |
|---|---|---|
| 4,087,856 A | 5/1978 | Attanasio |
| 5,325,496 A | 6/1994 | Hays et al. |
| 5,452,431 A | 9/1995 | Bournas |

FOREIGN PATENT DOCUMENTS

| | | |
|---|---|---|
| DE | 37 09 205 A1 | 9/1988 |
| DE | 0 526 114 A1 | 2/1993 |
| EP | 43 03 406 A1 | 8/1993 |

*Primary Examiner*—Matthew Kim
*Assistant Examiner*—Matthew D. Anderson
(74) *Attorney, Agent, or Firm*—Laurence A. Greenberg; Werner H. Stemer; Ralph E. Locher

(57) ABSTRACT

In a microcomputer intended for executing a multiplicity of user programs, a memory management unit ensures that none of the user programs can access other programs. However, in order to be able to use common library programs, and at the same time to prevent unchecked access to them, a vector memory area is provided which contains the start addresses of library programs as jump destinations. A library program is called by specifying the vector number, from which the memory management units determines he corresponding address in the vector memory area.

8 Claims, 2 Drawing Sheets

MICROCOMPUTER

CROSS-REFERENCE TO RELATED APPLICATION

This application is a continuation of copending International Application No. PCT/DE98/00319, filed Feb. 5, 1998, which designated the United States.

BACKGROUND OF THE INVENTION

Field of the Invention

In a microcomputer, the program being executed at any time has control over the computer, and/or the memories and other peripheral devices contained in and connected to it. Among other things, this results in that an address of a memory is always jumped to if it is contained in a program instruction, irrespective of whether the memory area containing the address is supposed to be available to the program or not.

In this way, memory areas could be examined whose memory contents are secret and access should be denied. As this is frequently not the case, security precautions need to be taken.

One possibility for such security precautions is to use a memory management unit, denoted MMU below, as it is provided, for example, in an iAPX286 chip from INTEL corporation. This is principally used when not only (chip) manufacturer programs, but also user programs, are to be executed, which can then be put to improper use. The MMU is disposed between the central processing unit, denoted CPU below, of the computer and the bus connecting this unit to the other units, such as memories.

Each application maintains an entry in the MMU, recording which memory contains the application, the address at which it begins, how long it is and what access rights exist. The user must specify these data when loading his application, or his program, into the memory of the microcomputer. The application program then has access rights only to memory areas lying within the area defined by the start address and length specified previously. Entering information into the MMU therefore describes a characteristic of a program stored in a data memory segment. The area containing this entry in the MMU is therefore termed a segment descriptor.

Every call to an address from the program is checked by the MMU, and the call is allowed only when the address lies in the permitted area, otherwise the program execution is terminated or an error message occurs.

In the case in which different users, programs are in memory, this provides the assurance for the particular users that other users cannot view or even alter their programs, since each user program can operate only within the area specified by the user when loading the program.

U.S. Pat. No. 5,452,431 describes a microcircuit with a CPU, which is connected via an address bus to a program memory which has several areas for user programs. A zonal memory area, in which start and end addresses and a reference code of the user programs are listed in a table, is assigned to the memory area for the user programs. When running a user program, the start and end addresses of the memory area of that user program are compared with actually called addresses, whereby an address which was called and which lies outside the area defined by start and end address, results in a program abort. This protective mechanism, however, does not exceed the possibilities for protection established by a MMU.

Published, Non-Prosecuted German Patent Application DE 37 09 205 A1 in combination with Published, Non-Prosecuted German Patent Application DE 35 33 787 A1 cited therein, describes a protective circuit for the protection of data stored in a memory area. A descriptor in which characteristics of that area are entered, is assigned to the memory area. It furthermore contains a preamble in which it is entered whether the data is protected. Furthermore, the preamble contains a vector that is stored in an intermediate memory every time that memory area is addressed. After a positive check-up of the access authorization to the protected data, the vector is transferred to the computerizing unit which manages the memory and which then calls up a program for processing the protected data, whose memory location is indicated by the vector. It is secured (guaranteed) therewith that the protected data is not processed randomly but by that particular program.

User programs usually contain subroutines. With these, different users frequently need the same subroutines, and hence the security precautions described above results in that these subroutines are repeatedly available. This requires an unnecessarily large amount of memory space. It is therefore desirable and would also make sense to provide subroutine libraries in a memory area of the microcomputer which can be accessed by different user programs, possibly incorporating particular security measures such as checking a personal identification number, for example.

However, this would again lead to the problems outlined above, namely that a user with fraudulent intent could access a library program at will by bypassing the checking routines.

SUMMARY OF THE INVENTION

It is accordingly an object of the invention to provide a microcomputer that overcomes the above-mentioned disadvantages of the prior art devices of this general type, which allows user programs to access library programs, but which is at the same time protected against manipulation.

With the foregoing and other objects in view there is provided, in accordance with the invention, a microcomputer, containing: an address bus; a memory management unit connected to the address bus; a central processing unit connected to the address bus and to the memory management unit by the address bus; and at least one program memory having at least one memory area for storing user programs and connected to the address bus and to the memory management unit via the address bus, each of the user programs being assigned in the memory management unit a segment descriptor storing at least a start address, a length and access rights of a respective user program, the at least one program memory further having a library program memory area for storing library programs and a vector memory area, a further segment descriptor having a segment descriptor label is stored in the memory management unit and describes an assignment of the vector memory area and the library program memory area, at least a vector number and a vector assigned to the vector number being stored in the vector memory area, and a call to a library program from the respective user program having to contain at least the segment descriptor label and the vector number to which the memory management unit assigns the vector, a jump to the library program called being effected by the vector.

In the microcomputer according to the invention, it is not possible to access a library program directly. Instead, a vector number is specified in the call instruction in addition to a label for the MMU segment descriptor describing the library program. The label for the MMU segment descriptor may be a number or a name, for example.

The MMU checks whether the vector number specified actually exists and whether it belongs to the library program called. If the test result is positive, access is permitted to a vector memory area whose start address and length are stored in the MMU segment descriptor. Only in this memory vector area is the vector number stored. Also in the memory vector area a jump address or an address of a jump instruction (i.e. a vector) to the library program start address is also stored. This effectively prevents a user from being able to access the library program directly and at the same time from possibly bypassing security routines.

Other features which are considered as characteristic for the invention are set forth in the appended claims.

Although the invention is illustrated and described herein as embodied in a microcomputer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
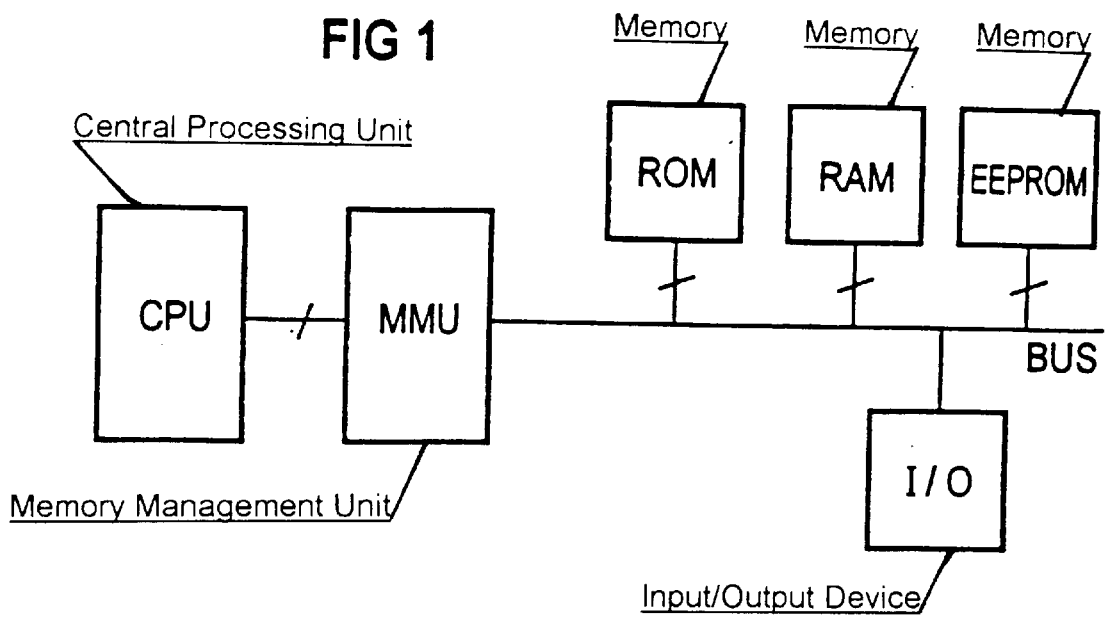
FIG. 1 is a diagrammatic, block diagram of a microcomputer according to the invention.

In all the figures of the drawing, sub-features and integral parts that correspond to one another bear the same reference symbol in each case. Referring now to the figures of the drawing in detail and first, particularly, to FIG. 1 thereof, there is shown components of a microcomputer in a highly schematic manner. A central processing unit CPU is connected to a memory management unit MMU via an address bus 1. The MMU is further connected via the address bus 1 of the microcomputer, to ROM, RAM and EEPROM memories and to an input/output device I/O. Any other units customary in microcomputers may also be provided, but these are not shown as they do not concern the invention. A control bus and a data bus are also not shown. The microcomputer according to the invention is intended to have all the components necessary for its operation, however, which are known from the prior art.

Figure 2:
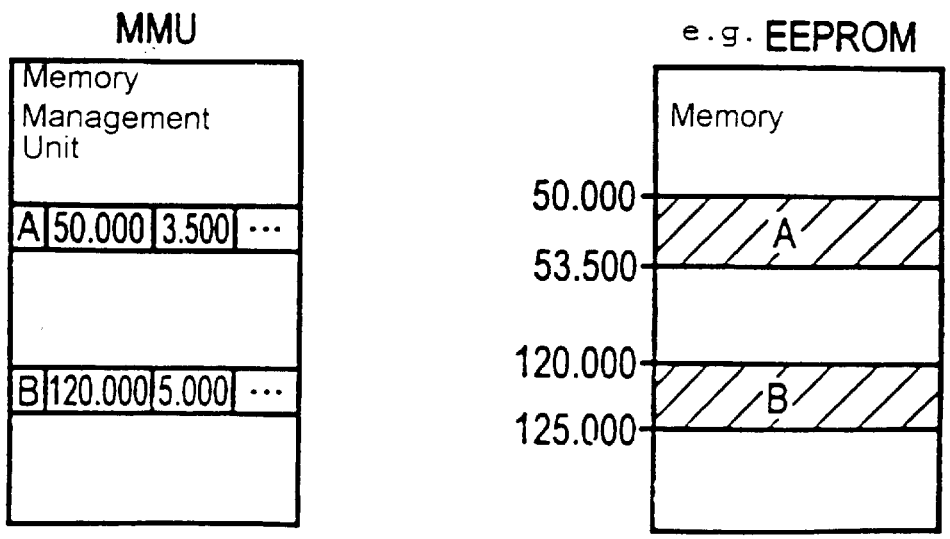
FIG. 2 is a block diagram of an assignment of user programs to contents of a memory management unit segment descriptors.

The CPU applies logic addresses to the MMU while the MMU determines the physical addresses from these and applies them to the memories ROM, RAM and EEPROM. For this purpose, the MMU, as shown in the left-hand part of FIG. 2, is provided with memory locations for segment descriptors, which contain a start address, a length and access rights assigned to an application program A, B. The MMU will additionally have a non-illustrated adder in order to be able to determine the physical address from the logic address by adding the start address of a user program. By way of example, the segments for two user programs A and B are shown, program A starts at an address 50,000 and has a length of 3,500 addresses, while program B starts at an address 120,000 and has a length of 5,000 addresses.

When program A is being executed in the CPU, addresses between 0 and 3499 are called, corresponding to the length of the program. These logic addresses are fed to the MMU which adds the start value 50,000 to them and applies the physical address obtained in this way to the internal address bus 1. The MMU checks beforehand whether the logic address lies in the address range corresponding to the length stored in the MMU segment descriptor. The MMU segment descriptor may be configured as a storage register, for example. For this check, the MMU contains non-illustrated comparators to which the current address, on the one hand, and the start and end addresses, on the other, of the current program are applied. If the program calls a higher or a lower address, it is terminated or an error message or something similar occurs.

A further area of an MMU segment descriptor contains access rights, so that it is possible to define whether read-only or read-write access to specific address ranges is possible.

It is irrelevant to the explanations thus far whether the user programs are held in the RAM, in the EEPROM or in a different type of memory, and which memory locations are to be accessed by a user program.

Figure 3:
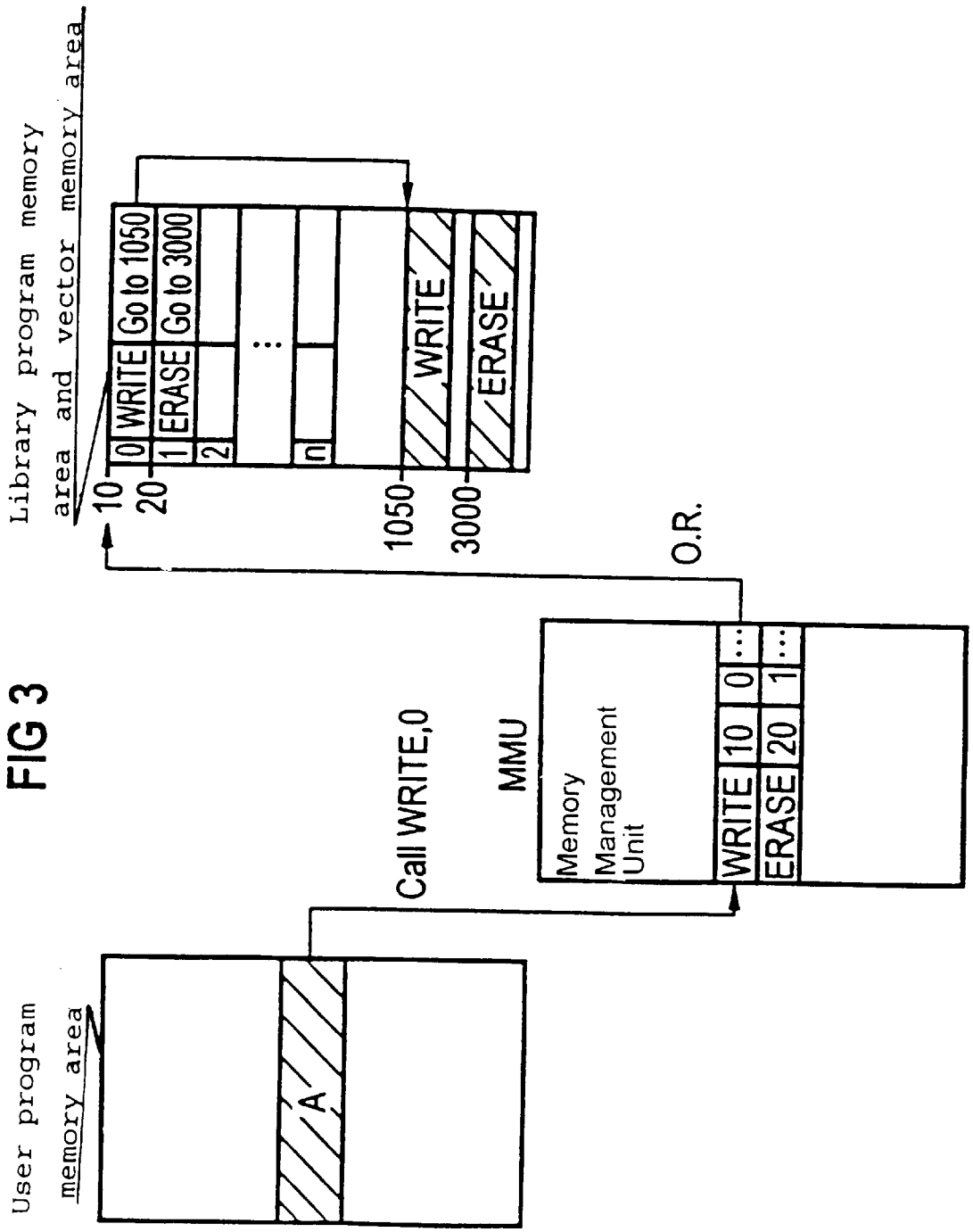
FIG. 3 is a block diagram of the manner in which a library program is called.

FIG. 3 now shows the development, according to the invention, of the microcomputer. This additionally provides a memory area for subroutines that are accessible to all users, that is to say a library program memory area. Any memory may be used for this.

By way of example, FIG. 3 shows a write program and an erase program in the library program memory at the addresses 1050 and 3000.

Inventively, a user program cannot now access these addresses directly, as otherwise it would also be possible to gain undefined access, by bypassing security precautions, to these programs. Instead, a vector memory area is provided which contains vector numbers and the start addresses, assigned to them, of the library programs as jump destinations (vectors) 1050, 3000. As an alternative, the address of a jump instruction leading to the subroutine could also be stored. In addition, the name of the subroutine may also be entered as an identifier, as shown in FIG. 3. This is not necessary, however.

A user does not discover the actual physical address of a library program. In addition to the security aspect, this also has the advantage that these programs can, if required, be relocated by the operating system as desired, without the user programs having to be altered. In this case, only the jump destination need be altered in the vector memory area.

Every library program memory area can be entered in the MMU just like any other program. Inventively, each library program memory area is assigned a vector memory area containing the vectors for the library programs located in the library program memory area. These vectors are entered by specifying the start address and the length of the vector memory area.

As an alternative, the vector memory area may also be entered in a segment descriptor of the MMU, the start address and the length of the library program memory area being entered in the segment descriptor in this case. In addition, it is possible to combine the vector memory area and the library program memory area and to specify a start address and two lengths in the segment descriptor.

The library program is called from a user program by specifying the MMU segment descriptor label such as the library program name or a number and the vector number, for example. The MMU then checks whether the vector number actually exists in the vector memory area and whether the program label called corresponds to the entry assigned to the vector number. The corresponding address in the vector memory area is addressed only if the test result is positive, and only then is a jump to the library program itself performed.

We claim:

1. A microcomputer, comprising:

an address bus;

a memory management unit connected to said address bus;

a central processing unit connected to said address bus and to said memory management unit by said address bus;

at least one program memory having at least one memory area for storing user programs and connected to said address bus and to said memory management unit via said address bus, each of the user programs being assigned in said memory management unit a segment descriptor storing at least a start address, a length and access rights of a respective user program, said at least one program memory further having a library program memory area for storing library programs and a vector memory area, said memory management unit having a further segment descriptor with a segment descriptor label describing an assignment of said vector memory area and said library program memory area, at least a vector number and a vector assigned to said vector number being stored in said vector memory area, and a call to a library program from the respective user program having to contain at least the segment descriptor label and said vector number to which said memory management unit assigns said vector, a jump to the library program called being effected by said vector.

2. The microcomputer according to claim 1, wherein said vector memory area and said library program memory area are assigned by specifying a start address and a length of said vector memory area in said further segment descriptor assigned to said library program memory area.

3. The microcomputer according to claim 1, wherein said vector memory area and said library program memory area are assigned by specifying a start address and a length of said library program memory area in said further segment descriptor assigned to said vector memory area.

4. The microcomputer according to claim 1, wherein said vector memory area and said library program memory area are assigned by coupling both of said vector memory area and said library program memory area to form a common memory area described by specifying a start address and two length criteria in said further segment descriptor.

5. The microcomputer according to claim 1, wherein said vector is a jump address.

6. The microcomputer according to claim 1, wherein said vector is an address of a jump instruction leading to a library program.

7. The microcomputer according to claim 1, wherein said vector number is determined from a relative position of said vector in said vector memory area.

8. The microcomputer according to claim 1, wherein the respective user program contains a program vector number and said at least one vector number is a plurality of vector numbers each having a plurality of bytes, and a current vector is determined by comparing said plurality of vector numbers contained in said vector memory area with the program vector number contained in a call.

* * * * *